United States Patent
Kruger et al.

(10) Patent No.: US 6,916,123 B2
(45) Date of Patent: Jul. 12, 2005

(54) UNLATCHING MECHANISM FOR AN OPTICAL TRANSCEIVER

(75) Inventors: Bruce P. Kruger, Oronoco, MN (US); Gary Heitkamp, Rochester, MN (US); Michael Francis Hanley, Rochester, MN (US); David Peter Gaio, Rochester, MN (US); Scott Michael Branch, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 135 days.

(21) Appl. No.: 10/657,548

(22) Filed: Sep. 8, 2003

(65) Prior Publication Data

US 2004/0101257 A1 May 27, 2004

Related U.S. Application Data

(60) Provisional application No. 60/409,232, filed on Sep. 10, 2002, and provisional application No. 60/438,400, filed on Jan. 7, 2003.

(51) Int. Cl.$^7$ ................................................. G02B 6/42
(52) U.S. Cl. ............................ 385/92; 385/88; 385/89; 385/139
(58) Field of Search ............................. 385/88–92, 139; 439/372

(56) References Cited

U.S. PATENT DOCUMENTS

| 5,901,263 | A | | 5/1999 | Gaio et al. ..................... 385/92 |
| 6,431,765 | B1 | * | 8/2002 | Chen et al. ..................... 385/92 |
| 6,439,918 | B1 | | 8/2002 | Togami et al. .............. 439/372 |
| 6,793,517 | B2 | * | 9/2004 | Neer et al. ................... 439/372 |

* cited by examiner

*Primary Examiner*—Frank G. Font
*Assistant Examiner*—Michael P. Mooney
(74) *Attorney, Agent, or Firm*—Allen, Dyer, Doppelt, Milbrath & Gilchrist, P.A.

(57) ABSTRACT

The present invention relates to an optical transceiver unlatching device for disengaging the optical transceiver from a mounting cage found in a host computer device. The unlatching device converts rotational motion from a bail handle into reciprocating motion for a sliding latch member, which disengages spring fingers extending from the mounting cage from abutment surfaces formed in the sides of the optical transceiver. A return spring, extending between the sliding latch member and the optical transceiver housing, is provided to bias the unlatching device into the latched position.

20 Claims, 8 Drawing Sheets

UNLATCHING MECHANISM FOR AN OPTICAL TRANSCEIVER

CROSS-REFERENCE TO RELATED APPLICATIONS

The present invention claims priority from U.S. patent applications Ser. No. 60/409,232 filed Sep. 10, 2002, and Ser. No. 60/438,400 filed Jan. 7, 2003.

TECHNICAL FIELD

The present invention relates to an unlatching device for an optical transceiver, and in particular to a pivoting bail unlatching device used for unlatching an optical transceiver from a cage.

BACKGROUND OF THE INVENTION

Optical transceivers have become an ubiquitous link in the fiber optic data communication and telecommunication industries for transferring information between host computer devices and fiber optic networks. Typically, each transceiver module includes a transmitter optical subassembly (TOSA) and a receiver optical subassembly (ROSA), along with the circuitry for the control thereof. The TOSA converts electrical signals from the host device into optical signals for launching into an optical fiber. Conversely, the ROSA receives optical signals from an optical fiber and converts them to electrical signals for transmission to the host device. A front end of the transceiver module includes optical connector ports for receiving connectorized ends of optical fibers, while a rear end of the transceiver module includes an electrical connector for insertion into a mating electrical connector on a circuit board in the host device.

With the advent of "hot pluggable" optical transceivers, latching devices have become a popular safety feature to ensure that the transceiver module is held within a guide rail or cage until purposely removed. Bail latching devices have become particularly popular, due to their functional and ergonomic advantages. Previous bail designs are disclosed in U.S. Pat. No. 5,901,263 issued to IBM Corp., and U.S. Pat. No. 6,439,918 issued to Finisar Corp. The bail in the IBM device forces plastic arms, which are normally biased inwardly, outwardly into engagement with the guide rail system. The bail in the Finisar device pivots a separate pivoting latch member, which is normally biased into engagement with the cage by a specially designed extension of the housing.

Figure 1:
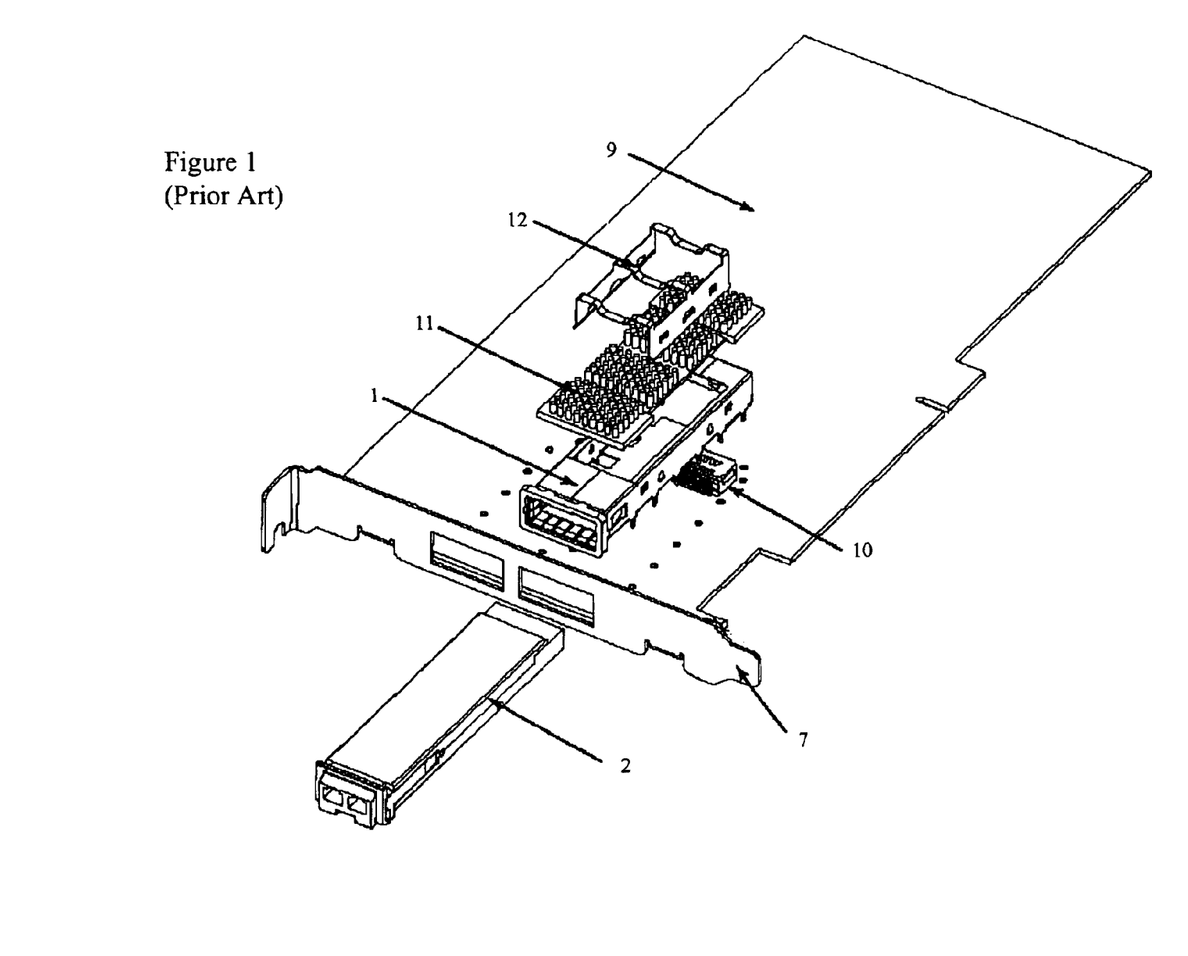
FIG. 1 is an exploded view of a conventional transceiver module and cage assembly.

Recent designs for cages, in particular (see FIGS. 1) a cage 1 designed for an XFP module 2 (according to the XFP Multi-Source Agreement), includes spring fingers 3 (one of which is shown), which are biased inwardly into the cage 1 for engaging a shoulder 4 on the transceiver housing 6. During insertion through a bezel 7 and the open end of the cage 1, the spring fingers 3 slide along a rear end of the transceiver housing 6 until the spring fingers 3 slide over the a shoulder 4 into engagement with abutment surfaces 8, which prevents the module 2 from being removed. At the same time an electrical connector 5 on the transceiver module 2 engages an electrical connector 10 in the cage 1, thereby electrically connecting the transceiver module 2 to a host board 9. The XFP transceiver module 2 also includes a heat sink 11 mounted on the module 2 by a spring clip 12.

An object of the present invention is to overcome the shortcomings of the prior art by providing an unlatching mechanism for disengaging a cage mounted spring finger from an abutment surface on a transceiver housing.

SUMMARY OF THE INVENTION

Accordingly, the present invention relates to an optical transceiver for insertion into a mounting cage, of the type including at least one spring finger extending into engagement with at least one abutment surface on the optical transceiver, comprising:

at least one optical sub-assembly for converting an optical signal into an electrical signal or for converting an electrical signal into an optical signal;

a housing for supporting each optical sub-assembly;

at least one optical connector port for receiving an optical fiber;

an electrical connector for transmitting electrical signals to and from each optical sub-assembly;

a sliding member reciprocatable on said housing between a latched and an unlatched position;

at least one camming member extending from said sliding member;

a bail handle pivotally mounted on said housing and engaged with said sliding member;

whereby rotation of said bail handle reciprocates said sliding member causing said camming member to disengage each spring finger from each abutment surface enabling the optical transceiver to be removed from the mounting cage.

Another aspect of the present invention relates to an unlatching mechanism for an opto-electronic device, of the type which is mountable in a cage attached to a circuit board in a host device, the cage having at least one spring finger for extending into contact with an abutment surface on a housing of the opto-electronic device, the unlatching mechanism comprising:

a sliding member reciprocatable on the housing between a latched and an unlatched position;

at least one camming member extending from said sliding member;

a bail handle pivotally mounted on the housing and engaged with said sliding member;

whereby rotation of said bail handle reciprocates said sliding member causing said camming member to disengage each spring finger from each abutment surface enabling the opto-electronic device to be removed from the cage.

BRIEF DESCRIPTION OF THE DRAWINGS

The invention will be described in greater detail with reference to the accompanying drawings, which represent preferred embodiments thereof, wherein.

DETAILED DESCRIPTION

Figure 2:
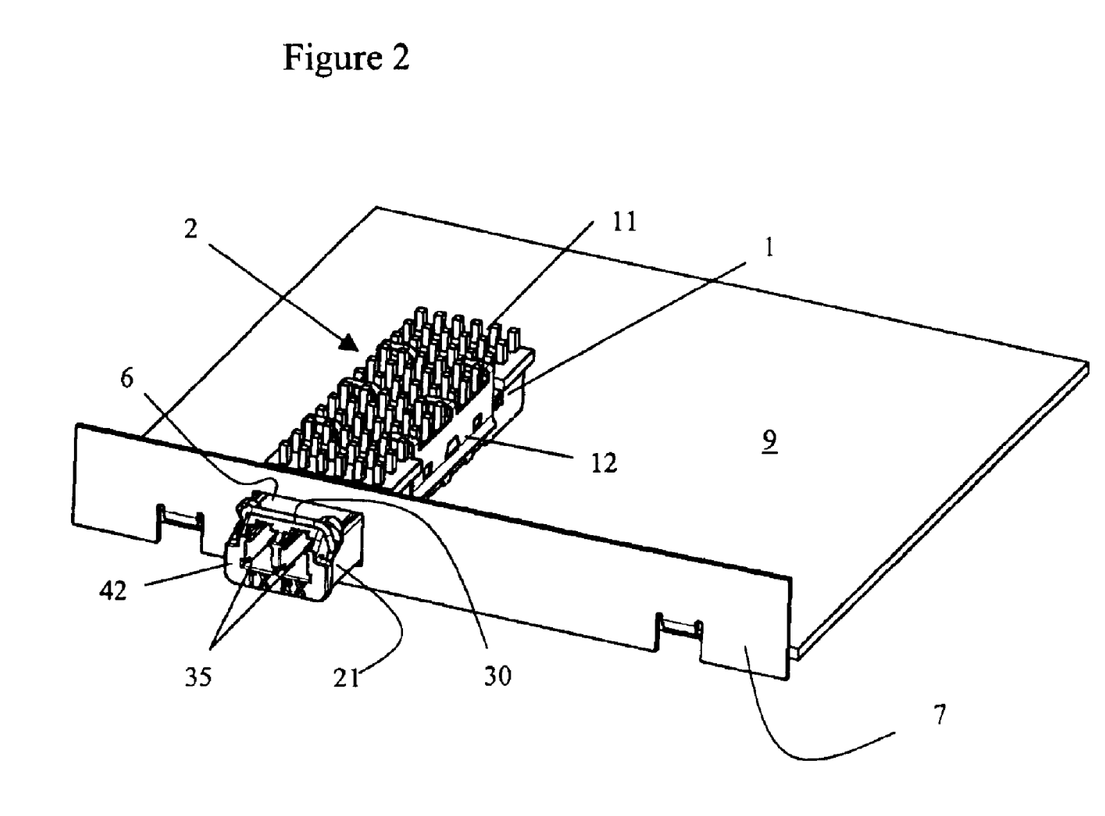
FIG. 2 is an isometric view of a transceiver module according to the present invention mounted in the transceiver cage of FIG. 1.
Figure 3:
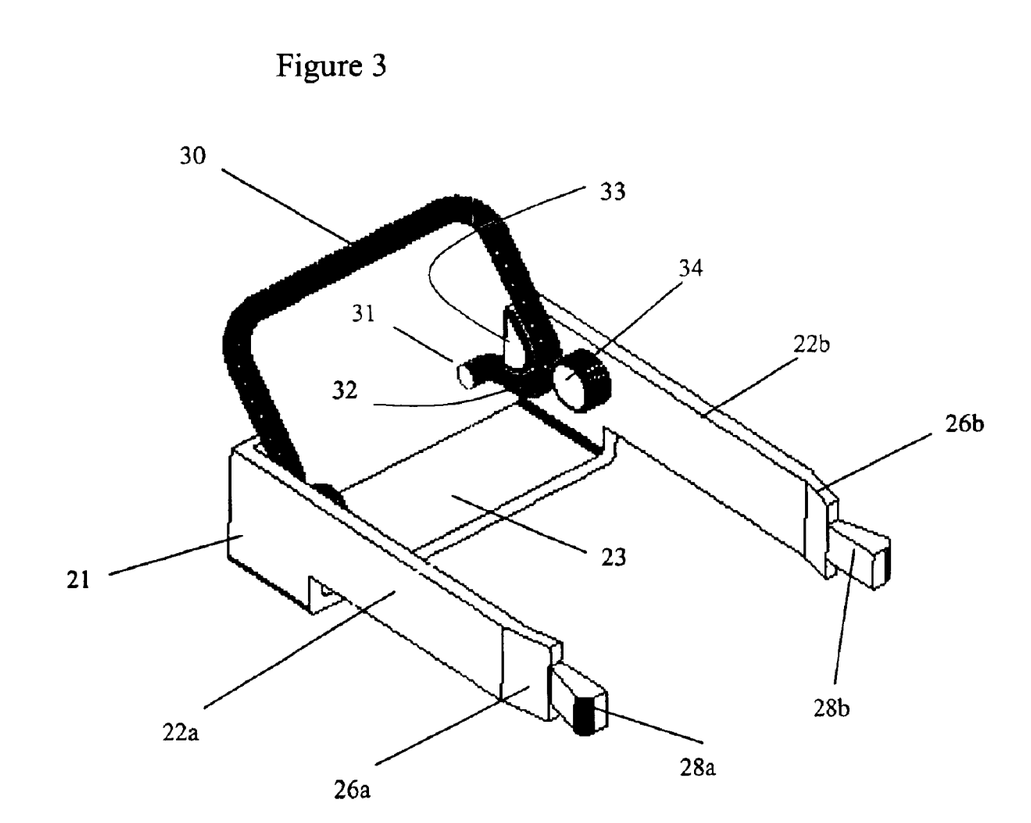
FIG. 3 is an isometric view of the bail and sliding member of the unlatch mechanism according to the present invention.
Figure 4:
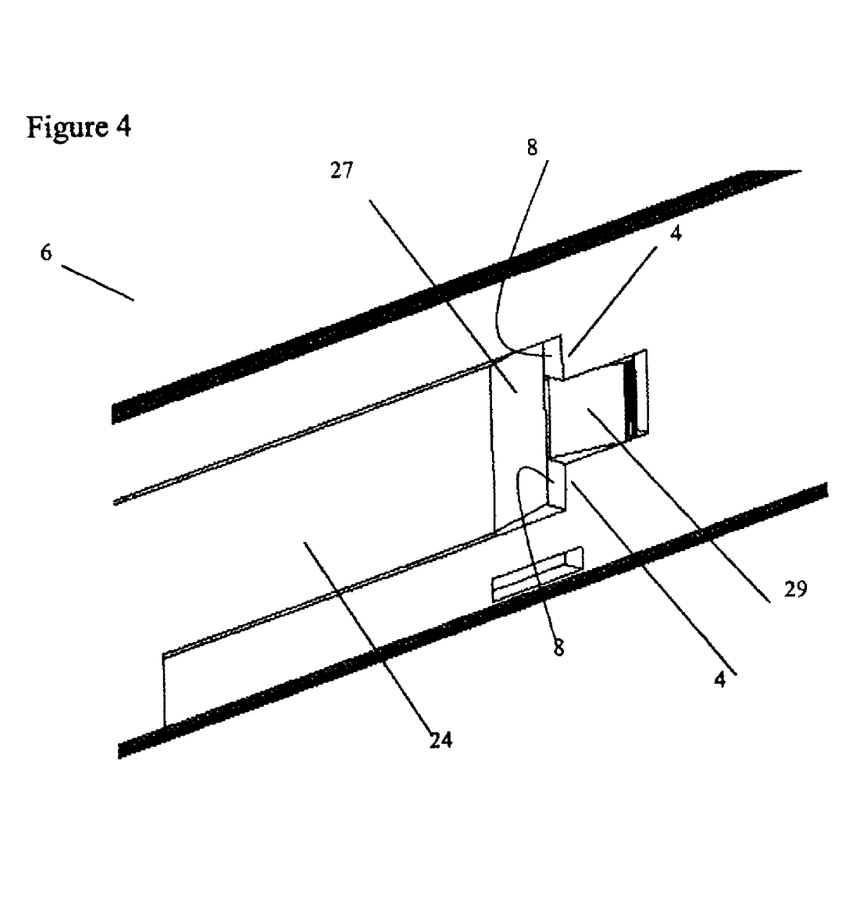
FIG. 4 is an isometric view of the bail and sliding member of the unlatch mechanism of FIG. 3.
Figure 6:
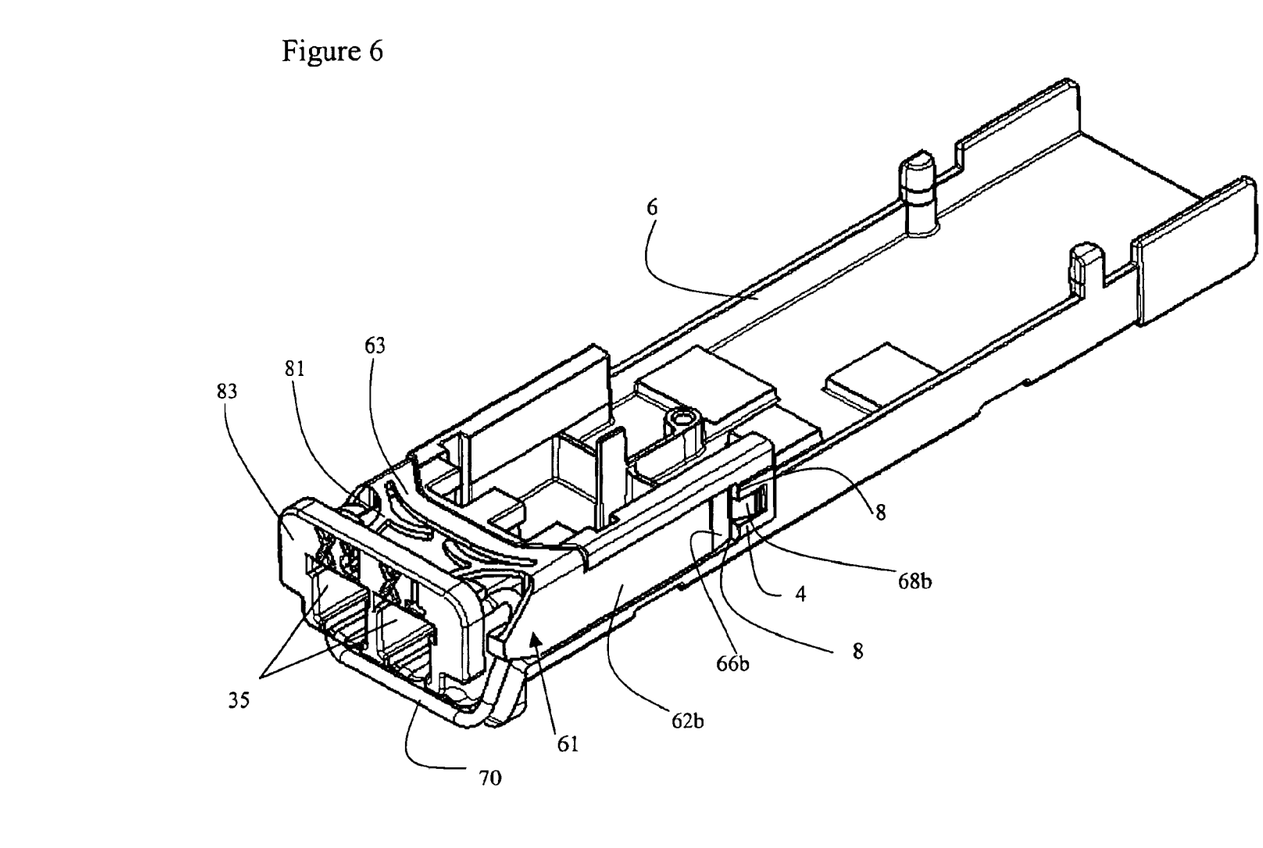
FIG. 6 is an isometric view of the transceiver housing is the latched position.
Figure 7:
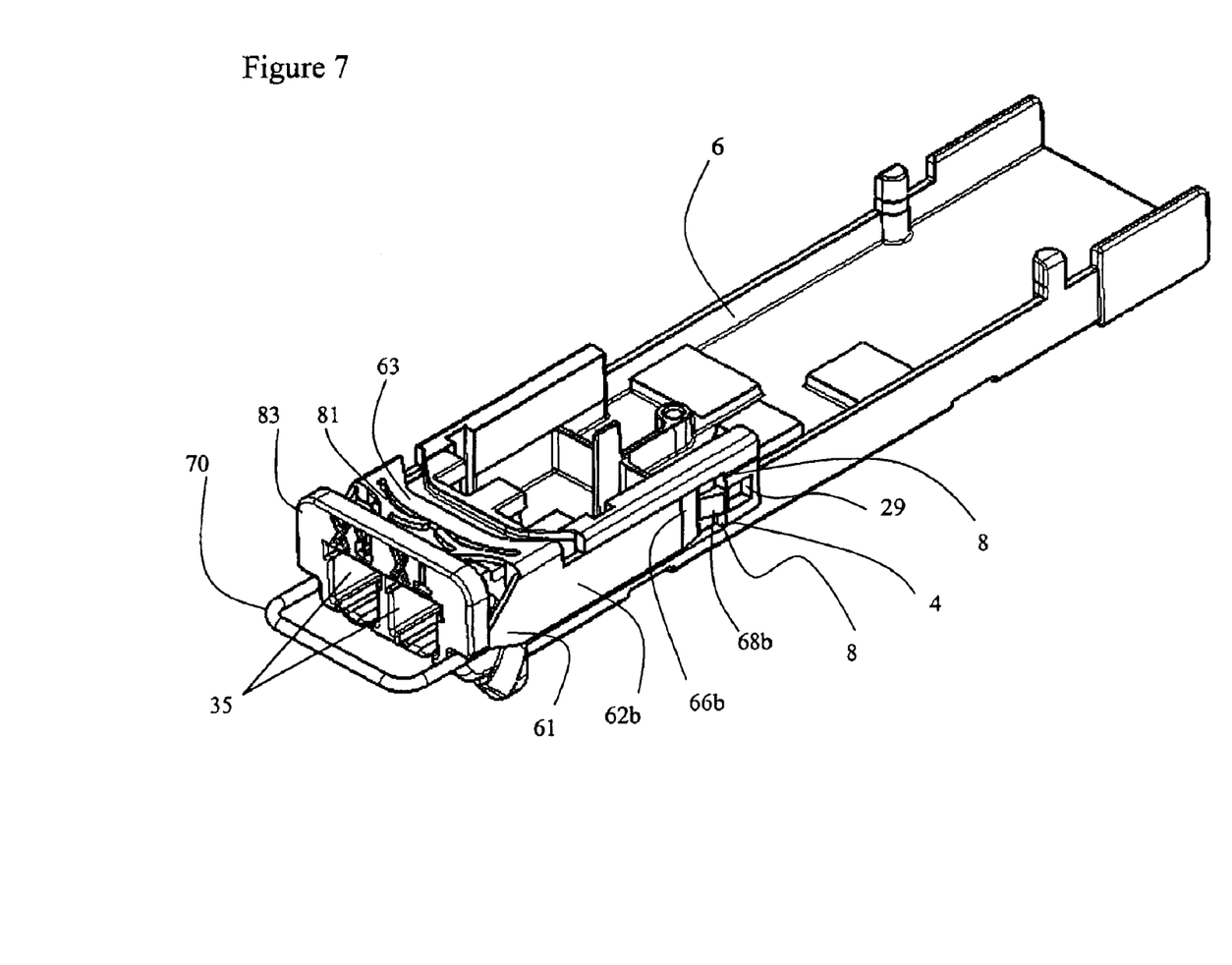
FIG. 7 is an isometric view of the transceiver housing of FIG. 6 in the unlatched position.
Figure 8:
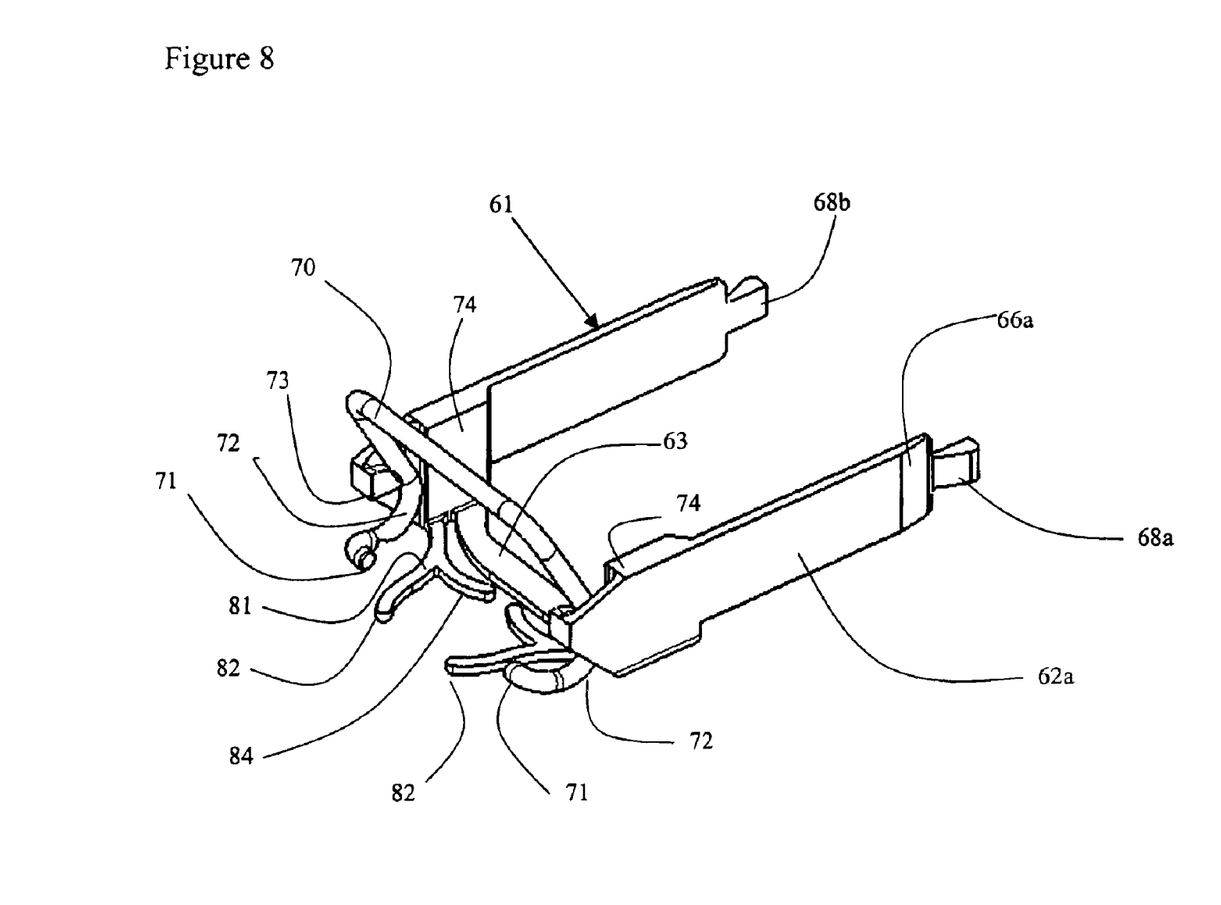
FIG. 8 is an isometric view of the sliding member of FIGS. 6 and 7.

With reference to FIGS. 2 to 4, the unlatching mechanism according to the present invention includes a sliding member 21, comprised of two rectangular sliding arms 22a and 22b, and a rectangular cross brace 23 extending therebetween. The sliding arms 22a and 22b are mounted in channels 24 (one shown in FIG. 4), which are provided in opposite sides of the transceiver housing 6. When in the channels 24, the sliding arms 22a and 22b are flush with the sides of the housing 6, so that the outside of transceiver module 2 matches the inside surface of the cage 1, while enabling the transceiver module 2 to be slid into and out of the mounting cage 1 with relative ease. The cross brace 23 extends across the bottom of the transceiver housing 6 between the sliding arms 22a and 22b. The outer free ends 26a and 26b of the sliding arms 22a and 22b, respectively, are bent inwardly towards each other for extending into ramped sections 27 at an end of the channels 24. The bent ends 26a and 26b enable the spring fingers 3 of the cage 1 to engage the abutment surfaces 8, while in the latched position (FIG. 6). Alternatively, the outer free ends 26a and 26b can be thinner than the rest of the sliding arms 22a and 22b to enable the spring fingers 3 to engage the abutment surfaces 8 (FIG. 8). Camming members 28a and 28b are mounted on the ends 26a and 26b, respectively, for disengaging the spring fingers 3 from the abutment surfaces 8. In the latched position (FIG. 6) the camming members 28a and 28b rest in recesses 29 in the sides of the transceiver housing 6 adjacent the ramped sections 27. Reciprocation of the sliding member 21 causes the camming members 28a and 28b to lift the spring fingers 3 out of engagement with the abutment surfaces 8 until the spring fingers 3 are clear of the shoulder 4 and able to slide over the remaining portion of the transceiver housing 6 (FIG. 7).

A bail handle 30 is pivotally mounted on one end of the sliding member to actuate the sliding member 21, as well as provide a handle by which the transceiver module 2 may be pulled out of the cage 1. Ends 31 of the bail 30 are pivotally mounted to the transceiver housing 6. Arcuate sections 32 of the bail 30 extend around semi-circular projections 33, which extend from the sliding arms 22a and 22b. Circular projections 34 also extend from the sliding arms 22a and 22b providing a bearing surface for the arcuate sections 32.

In the latched position (FIG. 6) the bail 30 is pivoted down and out of the way from in front of optical connector ports 35 enabling optical connectors to be received therein. The sliding arms 22a and 22b are rearwardly extending with the ends 26a and 26b positioned adjacent to the ramped sections 27, and the camming members 28a and 28b positioned in the recesses 29. As the bail 30 is rotated, the arcuate sections 32 apply a force to the semi-circular projections 33, thereby forcing the sliding member 21 forward, which causes the camming members 28a and 28b to lift the spring fingers 3 away from the abutment surfaces 8 as the spring fingers 3 ride up the surface of the camming members 28a and 28b. With the spring fingers 3 no longer in contact with the abutment surfaces 8, any pulling force applied to the bail 30 causes the entire transceiver module 2 to be slid from within the cage 1.

Figure 5:
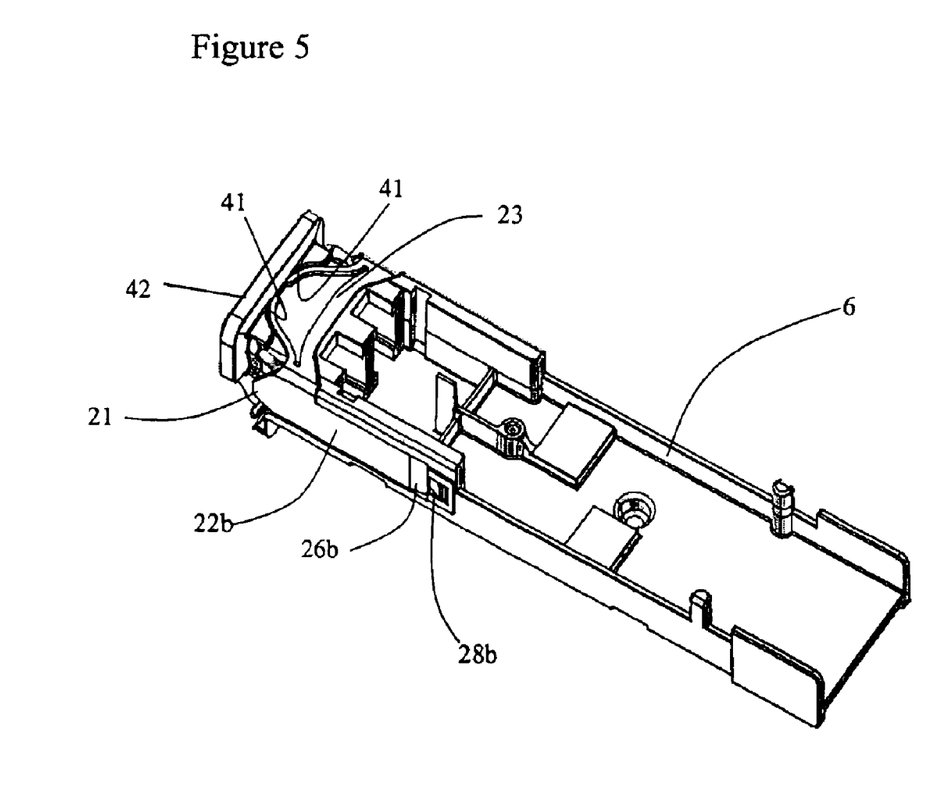
FIG. 5 is a side view of a transceiver housing without the sliding member of FIG. 3.

With reference to FIG. 5, another embodiment of the present invention includes a pair of return springs 41 extending from the cross brace 23. Curved outer free ends of the return springs 41 extend into close proximity with a front face plate 42, while in the latched position, whereby reciprocation of the sliding member 21 causes the return springs 41 to engage the front face plate 42 creating a restore force, which tends to return the sliding member 21 back to the latched position.

FIGS. 6, 7 and 8 illustrate another embodiment of the present invention, in which a sliding member 61 includes rearwardly-extending rectangular sliding arms 62a and 62b, and a cross brace 63. The ends 66a and 66b of the sliding arms 62a and 62b, respectively, are not bent as in the aforementioned embodiment, but simply taper slightly providing access to the abutment surfaces 8. Camming members 68a and 68b are provided for disengaging the spring fingers 3 from the abutment surfaces 8, as hereinbefore discussed. A wire bail 70 pivots from a latched position (FIG. 6) to an unlatched position (FIG. 7) to initiate the disengagement of the transceiver module 2 from the cage 1. A 90° bend, proximate each end of the bail 70, form bearing shafts 71, which are pivotally mounted on the housing 6, defining an axis of rotation for the bail 70. Arcuate sections 72, of the bail 70, extend around a curved projection 73, which extend from the sliding member 61. Retaining walls 74 extend from the sliding member 61 providing a bearing surface or a stop for the arcuate sections 72 during rotation of the bail 70. Rotation of the bail 70 results in the arcuate sections 72 applying a force to the curved projections 73, thereby reciprocating the sliding member 61, which enables the camming members 68a and 68b to lift the spring fingers 3 away from the abutment surfaces 8. Continued pulling force on the bail 70 disengages the mating electrical connectors 5 and 10, and pulls the transceiver module 2 from the cage 1. A pair of Y-shaped return springs 81 are provided for biasing the sliding member 61 back into the latched position. One arm 82 of the return spring 81 engages the front face plate 83, while another arm 84 engages the cross brace 63. By engaging both surfaces at once the spring force is increased, as well as the durability of the return springs 81.

We claim:

1. An optical transceiver for insertion into a mounting cage, of the type including at least one spring finger extending into engagement with at least one abutment surface on the optical transceiver, comprising:

at least one optical sub-assembly for converting an optical signal into an electrical signal or for converting an electrical signal into an optical signal;

a housing for supporting each optical sub-assembly;

at least one optical connector port for receiving an optical fiber;

an electrical connector for transmitting electrical signals to and from each optical sub-assembly;

a sliding member reciprocatable on said housing between a latched and an unlatched position;

at least one camming member extending from said sliding member;

a bail handle pivotally mounted on said housing and engaged with said sliding member;

whereby rotation of said bail handle reciprocates said sliding member causing said camming member to disengage each spring finger from each abutment surface enabling the optical transceiver to be removed from the mounting cage.

2. The device according to claim 1, wherein the bail handle includes an arcuate portion; and wherein the sliding member includes a projection, around which the arcuate portion extends; whereby force applied to rotate said bail handle is transferred from the arcuate portion to the projection, thereby reciprocating said sliding member.

3. The device according to claim 2, wherein the bail handle includes a pair of 90° bends therein forming a pair of bearing shafts, which define an axis of rotation of the bail handle.

4. The device according to claim 1, further comprising a return spring extending between the housing and the sliding member for biasing the sliding member into the latched position.

5. The device according to claim 4, wherein the return spring is comprised of a Y-shaped spring member, with one arm of the spring member for contacting the sliding member and one arm for contacting the housing.

6. The device according to claim 1, wherein the sliding member comprises first and second sliding arms and a cross brace extending between the first and second sliding arms.

7. The device according to claim 6, further comprising first and second channels, in opposite sides of the housing, for receiving the first and second sliding arms, respectively, flush with the sides of the housing, facilitating easy insertion and withdrawal of the housing from the mounting cage.

8. The device according to claim 7, wherein the at least one abutment surface comprises first and second abutment surfaces at the end of the first and second channels, respectively; wherein the at least one spring finger comprises first and second spring fingers extending from opposite sides of the cage; and wherein each of the first and second sliding arms includes a bent portion for extending inwardly from the sides of the housing enabling the first and second spring fingers to engage the first and second abutment surfaces, respectively.

9. The device according to claim 8, wherein the at least one camming member comprises first and second camming members extending from the first and second sliding arms, respectively; and wherein the first and second camming members extend from the bent portions.

10. The device according to claim 6, further comprising a return spring extending between the housing and the sliding member for biasing the sliding member into the latched position.

11. The device according to claim 10, wherein the return spring extends from the cross brace into contact with the housing.

12. The device according to claim 11, wherein the return spring is comprised of a Y-shaped spring member, with one arm of the spring member for contacting the cross brace and one arm for contacting the housing.

13. The device according to claim 6, wherein the bail handle includes first and second arcuate sections; wherein the first sliding arm includes a first projections, and the second sliding arms includes a second projection; and wherein the first and second arcuate sections extend around the first and second projections, respectively; whereby force applied to rotate said bail handle is transferred from the first and second arcuate sections to the first and second projections, thereby reciprocating said sliding member.

14. The device according to claim 6, wherein the bail handle includes a pair of 90° bends therein forming a pair of bearing shafts, which define an axis of rotation of the bail handle.

15. An unlatching mechanism for an opto-electronic device, of the type which is mountable in a cage attached to a circuit board in a host device, the cage having at least one spring finger for extending into contact with an abutment surface on a housing of the opto-electronic device, the unlatching mechanism comprising:

a sliding member reciprocatable on the housing between a latched and an unlatched position;

at least one camming member extending from said sliding member;

a bail handle pivotally mounted on the housing and engaged with said sliding member;

whereby rotation of said bail handle reciprocates said sliding member causing said camming member to disengage each spring finger from each abutment surface enabling the opto-electronic device to be removed from the cage.

16. The mechanism according to claim 15, wherein the bail handle includes an arcuate portion; and wherein the sliding member includes a projection, around which the arcuate portion extends; whereby force applied to rotate said bail handle is transferred from the arcuate portion to the projection, thereby reciprocating said sliding member.

17. The mechanism according to claim 15, further comprising a return spring extending between the housing and the sliding member for biasing the sliding member into the latched position.

18. The mechanism according to claim 16, wherein the return spring is comprised of a Y-shaped spring member, with one arm of the spring member for contacting the sliding member and one arm for contacting the housing.

19. The mechanism according to claim 15, wherein the sliding member comprises first and second sliding arms and a cross brace extending between the first and second sliding arms.

20. The device according to claim 15, wherein the bail handle includes a pair of 90° bends therein forming a pair of bearing shafts, which define an axis of rotation of the bail handle.

\* \* \* \* \*